United States Patent
Nicol et al.

(10) Patent No.: US 9,720,817 B2
(45) Date of Patent: Aug. 1, 2017

(54) HIERARCHICAL SYSTEM-CAPABILITY TESTING

(71) Applicant: LinkedIn Corporation, Mountain View, CA (US)

(72) Inventors: John W. Nicol, San Jose, CA (US); Alan D. Cabrera, El Cerrito, CA (US); Elbert H. Tsay, San Jose, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 105 days.

(21) Appl. No.: 14/801,712

(22) Filed: Jul. 16, 2015

(65) Prior Publication Data

US 2017/0017565 A1    Jan. 19, 2017

(51) Int. Cl.
*G06F 11/00*    (2006.01)
*G06F 11/36*    (2006.01)
*G06F 11/07*    (2006.01)

(52) U.S. Cl.
CPC ...... *G06F 11/3688* (2013.01); *G06F 11/0793* (2013.01)

(58) Field of Classification Search
CPC ............ G06F 11/0706; G06F 11/0718; G06F 11/079; G06F 11/0793; G06F 11/3668–11/3692
See application file for complete search history.

(56) References Cited

U.S. PATENT DOCUMENTS

| | | | |
|---|---|---|---|
| 8,156,378 B1 * | 4/2012 | Suit | G06F 11/0709 714/26 |
| 2012/0008506 A1 * | 1/2012 | Astigarraga | H04L 41/0677 370/242 |

* cited by examiner

*Primary Examiner* — Joseph Kudirka
(74) *Attorney, Agent, or Firm* — Park, Vaughan, Fleming & Dowler LLP

(57) ABSTRACT

In order to perform system-capability testing, an application in an application layer may provide predefined system capabilities and/or requirements of or associated with the application to a communication plugin in a data-link layer, such as availability of communication via a network and/or a latency of the network less than a predefined value. In response, the communication plugin may determine feedback information that specifies whether the predefined system capabilities are available and whether the predefined requirements are satisfied. Then, the communication plugin may provide the feedback information to the application. When the feedback information indicates that a system capability is unavailable, remedial action may be performed. For example, the remedial action may include updating a version of the application, updating a version of the communication plugin, and/or updating a path to a location in a network.

20 Claims, 4 Drawing Sheets

HIERARCHICAL SYSTEM-CAPABILITY TESTING

BACKGROUND

Field

The described embodiments relate to techniques for testing system capabilities. More specifically, the described embodiments relate to techniques for testing system capabilities between an application layer and a data-link layer.

Related Art

Modern software applications often include multiple program modules or blocks of code that perform specific functions. Many of the program modules are interdependent. Consequently, in order for the overall application to execute appropriately, the constituent program modules typically need to execute correctly.

However, the execution of many program modules can depend on the availability of system resources, such as a communication network. When a network is unavailable, the associated program module may fail. In turn, this failure may affect the operation of other program modules. In the worst case, the overall application may fail.

But in an absence of an understanding of the underlying failure mechanism, it may be difficult if not impossible to take appropriate corrective or remedial action. Such application failures are often very frustrating to users and can degrade the user experience when using applications.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to perform system-capability testing, an application in an application layer may provide predefined system capabilities and/or requirements of or associated with the application to a communication plugin in a data-link layer, such as availability of communication via a network and/or a maximum or threshold latency of the network. In response, the communication plugin may determine feedback information that specifies whether the predefined system capabilities are available and whether the predefined requirements are satisfied.

Then, the communication plugin may provide the feedback information to the application. When the feedback information indicates that a system capability is unavailable, remedial action may be performed. For example, the remedial action may include updating a version of the application, updating a version of the communication plugin, and/or updating a path to a location in a network.

This approach to system-capability testing may be repeated for multiple applications that are associated with a service, using multiple plugins that are associated with the applications (such as a logging plugin, a database plugin, a version plugin, and/or a binary-repository plugin) to provide additional feedback information for additional predefined system capabilities that are associated with the applications. Moreover, the plugins may be arranged in a hierarchy, so that interdependencies can be assessed. For example, when a given system capability assessed by a plugin at a lower level in the hierarchy is unavailable, a second system capability assessed by a second plugin at a higher level in the hierarchy may also be unavailable.

In this way, this system-capability-testing technique may provide system situation awareness about the availability of particular system capabilities that are used by the applications in the service and the underlying origin of any deficiencies that are found. Consequently, the system-capability-testing technique may facilitate prompt and effective remedial action, which may reduce failures and/or improve the performance of the service. Therefore, the system-capability-testing technique may reduce user frustration and may improve the user experience when using the applications and/or the service.

In the discussion that follows, an individual or a user may be a person (for example, an existing user of a social network or a new user of a social network). Also, or instead, the system-capability-testing technique may be used by any type of organization, such as a business. Furthermore, a 'business' should be understood to include for-profit corporations, non-profit corporations, groups (or cohorts) of individuals, sole proprietorships, government agencies, partnerships, etc.

Figure 1:
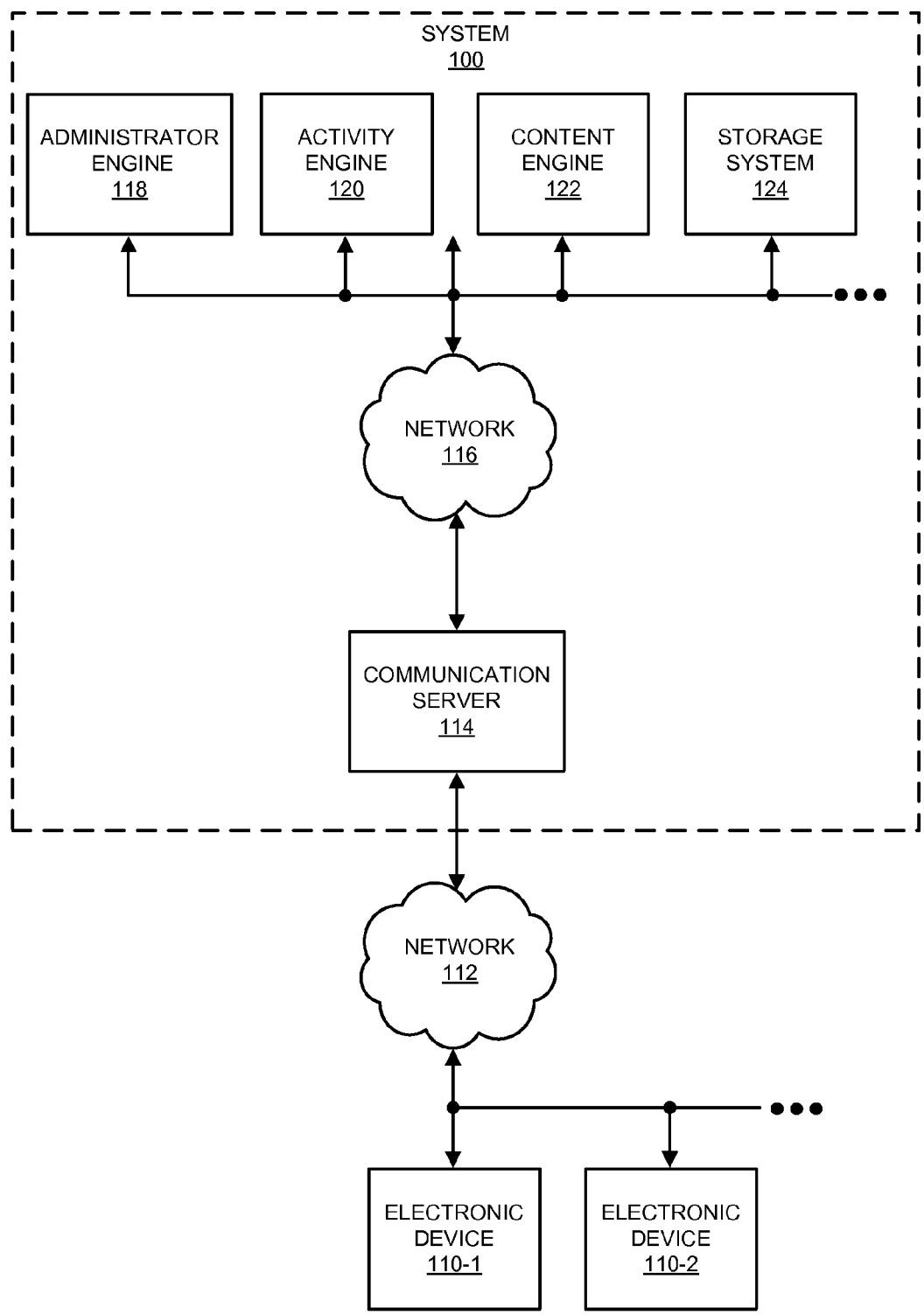
FIG. 1 is a block diagram illustrating a system used to perform system-capability testing in accordance with an embodiment of the present disclosure.

We now describe embodiments of the system and its use. FIG. 1 presents a block diagram illustrating a system 100 that performs the system-capability-testing technique. In this system, users of electronic devices 110 may use a service that is, at least in part, provided using one or more software products or applications executing in system 100. As described further below, the applications may be executed by engines in system 100.

Moreover, the service may, at least in part, be provided using instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

A wide variety of services may be provided using system 100. In the discussion that follows, a social network (and, more generally, a network of users), such as a professional social network, which facilitates interactions among the users, is used as an illustrative example. Moreover, using one of electronic devices 110 (such as electronic device 110-1) as an illustrative example, a user of electronic device 110-1 may use the software application and one or more of the applications executed by engines in system 100 to interact with other users in the social network. For example, administrator engine 118 may handle user accounts and user profiles, activity engine 120 may track and aggregate user behaviors over time in the social network, content engine 122 may receive user-provided content (audio, video, text, graphics, multimedia content, verbal, written, and/or recorded information) and may provide documents (such as presentations, spreadsheets, word-processing documents, web pages, etc.) to users, and storage system 124 may maintain data structures in a computer-readable memory that may encompass multiple devices, i.e., a large-scale storage system.

Note that each of the users of the social network may have an associated user profile that includes personal and professional characteristics and experiences, which are sometimes collectively referred to as 'attributes' or 'characteristics.' For example, a user profile may include: demographic information (such as age and gender), geographic location, work industry for a current employer, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors may include: log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network. Furthermore, the interactions among the users may help define a social graph in which nodes correspond to the users and edges between the nodes correspond to the users' interactions, interrelationships, and/or connections.

Because the software products or applications executed by system 100 are often interdependent, failures at lower levels in an Open System Interconnection (OSI) model can result in disruption or performance degradation of the applications and associated services, such as the social network. However, it is often difficult to assess the capabilities of system 100 to determine if everything is working as it needs to in order to support a service (such as the social network) and, if not, to perform appropriate remedial action.

In order to address this problem, system 100 may include multiple plugins that determine whether particular system capabilities associated with one or more applications are available and/or achieved. Based on this feedback information from the plugins, system 100 (or an operator of system 100) may take appropriate remedial action to address a deficiency. Moreover, the plugins may be arranged in a hierarchy, so that when a given system capability assessed by a plugin at a lower level in the hierarchy is unavailable, a second system capability assessed by a second plugin at a higher level in the hierarchy is also unavailable. In this way, the system-capability-testing technique may implicitly incorporate and assess the interdependence of different program modules or functions at different levels in the OSI model.

Figure 2:
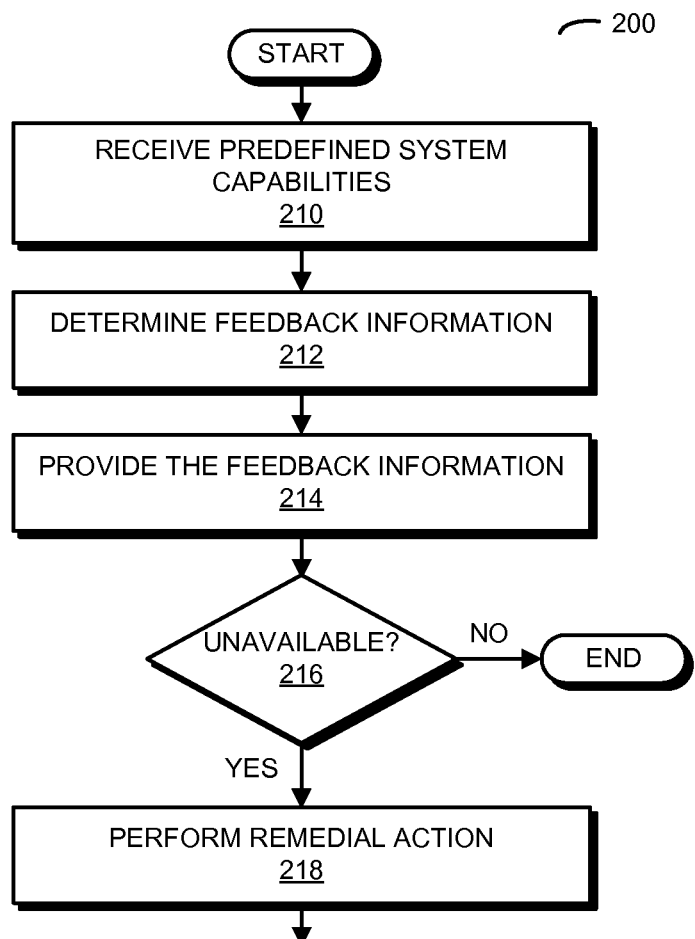
FIG. 2 is a flow chart illustrating a method for performing system-capability testing in accordance with an embodiment of the present disclosure.
Figure 3:
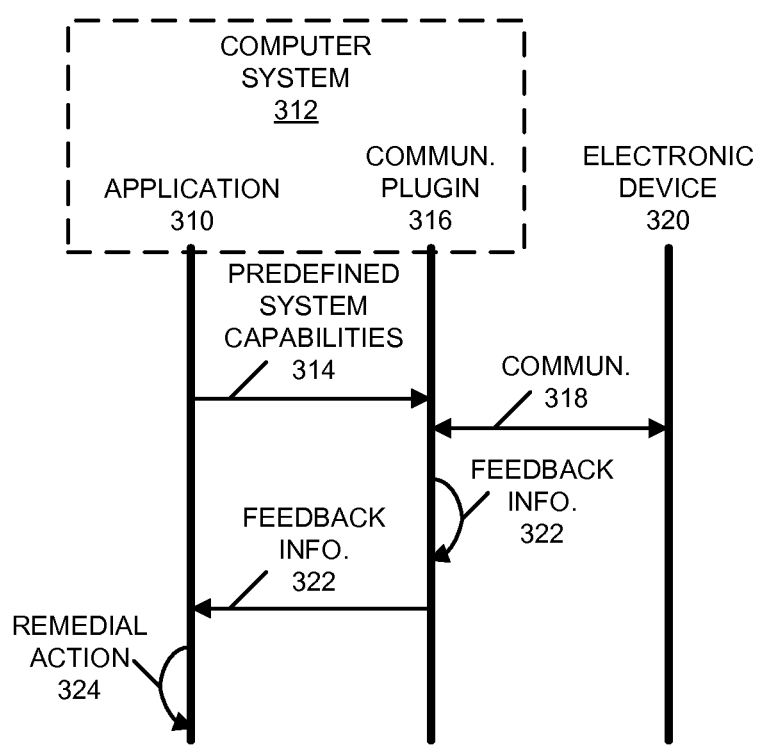
FIG. 3 is a drawing illustrating interaction between a communication plugin and an application in one of the electronic devices of FIG. 1 in accordance with an embodiment of the present disclosure.

For example, as described further below with reference to FIGS. 2 and 3, an application in an application layer may provide predefined system capabilities and/or requirements of or associated with the application (such as an availability of communication via a network, that a latency of the network is less than a predefined value, configuration of an application, a network, an environment and/or a computer system, etc.) to a communication plugin in a data-link layer. (In the present discussion, note that a 'plugin' may include a hardware or software module that adds a specific feature or functionality to system 100, such as the ability to assess predefined system capabilities and to provide associated feedback information.) Then, the communication plugin may determine feedback information that specifies whether the predefined system capabilities are available (or whether one or more related performance metrics are achieved, whether an application, a network, an environment and/or a computer system is misconfigured, etc.).

Moreover, the communication plugin may provide the feedback information to the application. When the feedback information indicates that a system capability is unavailable or a requirement is not satisfied, system 100 may perform a remedial action. For example, system 100 may update a version of the application, update a version of the communication plugin and/or update a path to a location (such as a Uniform Resource Locator or URL) in a network where content associated with the application may be accessed.

Similarly, when there are multiple applications associated with a service, there may be predefined system capabilities associated with the other applications, and plugins in system 100 may determine feedback information that specifies whether these predefined system capabilities are available (or whether one or more related performance metrics are achieved). For example, in response to receiving second predefined system capabilities from one of the other applications, a second plugin in the application layer (such as a logging plugin, a database plugin, a version plugin, and/or a binary-repository plugin) may determine second feedback information that specifies whether the second predefined system capabilities are available. Then, the second plugin may provide the second feedback information to the one of the other applications and, when the second feedback information indicates that a second system capability is unavailable, system 100 may perform a second remedial action.

In these ways, the system-capability-testing technique may allow system 100 to assess the performance of a complicated and/or hierarchical arrangement of program modules associated with applications and (as needed) to take appropriate remedial action. Consequently, the system-capability-testing technique may improve the availability and the performance or functioning of system 100, which may reduce user frustration and which may improve the user experience. Therefore, the system-capability-testing technique may increase engagement with or use of the social network, and thus may increase the revenue of a provider of the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

We now describe embodiments of the system-capability-testing technique. FIG. 2 presents a flow chart illustrating a method 200 for performing system-capability testing, which may be performed by a computer system (such as system 100 in FIG. 1 or computer system 400 in FIG. 4). During operation, a communication plugin in a data-link layer in the computer system may receive predefined system capabilities (operation 210) associated with the application from an application executing in the computer system. Then, the communication plugin may determine feedback information (operation 212) that specifies whether the predefined system capabilities are available.

Moreover, the communication plugin may provide the feedback information (operation 214) to the application. When the feedback information indicates that a system capability is unavailable (operation 216), the computer system may perform a remedial action (operation 218). For example, the computer system may update a version of the application, update a version of the communication plugin and/or update a path to a location in a network where content associated with the application may be accessed. Otherwise, when the feedback information indicates that the system capability is available (operation 216), method 200 may end.

As noted previously, operations 210-218 may be repeated, independently performed and/or iteratively performed (e.g., sequentially) for other plugins for multiple applications associated with a service. In particular, the other plugins may determine additional feedback information that specifies whether predefined system capabilities associated with the other applications are available. Based on this feedback information, the computer system may perform additional remedial action. In general, the plugins may be in one or more layers in the OSI model, including an application layer.

In an exemplary embodiment, method 200 is implemented using one or more applications and associated program modules in the computer system that interact with each other. This is illustrated in FIG. 3. During this method, an application 310 executing in computer system 312 (which may implement some or all of the functionality of system 100 in FIG. 1) may provide predefined system capabilities 314 associated with application 310 to a communication plugin 316 in a data-link layer in computer system 312. Then, communication plugin 316 may determine feedback information 322 that specifies whether predefined system capabilities 314 are available. For example, communication plugin 316 may determine feedback information 322 by assessing the availability and/or performance of communication 318 via a network with electronic device 320.

Moreover, communication plugin 316 may provide feedback information 322 to application 310. When feedback information 322 indicates that a system capability is unavailable, application 310 and/or computer system 312 may perform a remedial action 324.

In some embodiments of method 200 (FIGS. 2 and 3), there may be additional or fewer operations. Moreover, the order of the operations may be changed, and/or two or more operations may be combined into a single operation.

In an exemplary embodiment, the system-capability-testing technique provides a sanity checker that assesses misconfiguration of a computer system or factors that can disrupt a service (such as the absence of a network connectivity or availability). For example, the sanity checker may assess a set of potential problems, such as network connectivity (e.g., intranet and/or Internet), security blocking, intermittency, configuration, blocking of a registry, server misconfiguration, etc. When a problem is identified, the sanity checker may facilitate remedial action, such as fixing the problem.

The sanity checker may be implemented using plugins that can be arranged in a hierarchy that performs dependency analysis. For example, the plugins may be tied into a build system (like software libraries). Thus, there may be a list of or teams of plugins that are associated with multiple applications and/or services. In particular, an intranet plugin can verify intranet connectivity (such as by assessing whether a particular URL can be accessed). Moreover, the intranet plugin may require or depend on a server plugin. Alternatively or additionally, the version-control plugin may require or depend on an Internet plugin and/or an intranet plugin. Note that version-control systems transmit/receive information between clients and a central version-control server via network connectivity. Consequently, if the intranet or Internet is down, the version-control system is most likely down (while some client-side work can still be accomplished, there is likely no server-side communications). Furthermore, a configuration-team plugin may require or depend on the intranet plugin, the Internet plugin, the version-control plugin, etc. Each of these plugins may assess predefined system capabilities or requirements, such as a latency to a particular website of less than 300 ms (as evidenced by a Hypertext Transfer Protocol or HTTP status code of 404, 200).

This approach may allow an arbitrary system-capability test or checking function to be created. Instead of building the system-capability checks into a given application, the system-capability-testing technique may allow the testing to be modularized, to assess dependencies, to be logged and/or to facilitate remedial actions. For example, the logging may be to a screen, an email address, a bug log or an issue-tracking product, and/or a centralized logging repository or framework. Furthermore, by concurrently running the plugins on multiple computers in a computer system, the system-capability-testing technique may be efficiently scaled to an arbitrary large computer system.

Thus, the system-capability-testing technique may be implemented using an object-oriented programming approach. The plugins may include a logging plugin, a database plugin (or multiple database plugins for different databases), a version plugin or a version-control plugin (for source code, e.g., for text files), and/or a binary-repository plugin (for built files).

For example, a configuration-team plugin may require or depend on: one or more intranet plugins, an Internet plugin, a database plugin, a logging plugin, a version-control plugin, a binary-repository plugin, and/or an environment plugin. These plugins may assess or verify predefined system capabilities such as network health/connectivity, latency, etc. In particular, call commands for these plugins may include one or more predefined system capabilities that are assessed. Thus, the Internet plugin may be invoked using a command such as 'Internet plugin(latency=300 ms)' or 'Internet plugin (URL='http://company3.com', status=200, protocol=HTTP),' a first intranet plugin may be invoked using a command such as 'First intranet plugin(latency=200 ms, URL='company1.com', status=200),' and a second intranet plugin may be invoked using a command such as 'Second intranet plugin(latency=450 ms, URL='company2.com', status=200).'

Moreover, a database plugin may be invoked using a command such as 'Database plugin (URL='database_location.com', statement='select count from table', result=5),' a logging plugin may be invoked using a command such as 'Logging plugin(event=test event, URL='logging_application_location.com', result=success),' and a version-control plugin may be invoked using a command such as 'Version-control plugin (URL='version_control_application_location.com', path='path/readme.txt', latency=300 ms, result=exist)' or 'Version-control plugin(executable='application', version>=4.5, remedial action=application upgrade(v4.5)).'

Furthermore, a binary-repository plugin may be invoked using a command such as 'Binary-repository plugin (URL='binary_repository_location.com', path='path', latency=500 ms, HTTP result=200),' and an environment plugin may be invoked using a command such as 'Environment plugin(OS=Linux, path contains '/user/bin', remedial action='add to path('/user/bin')).'

Figure 4:
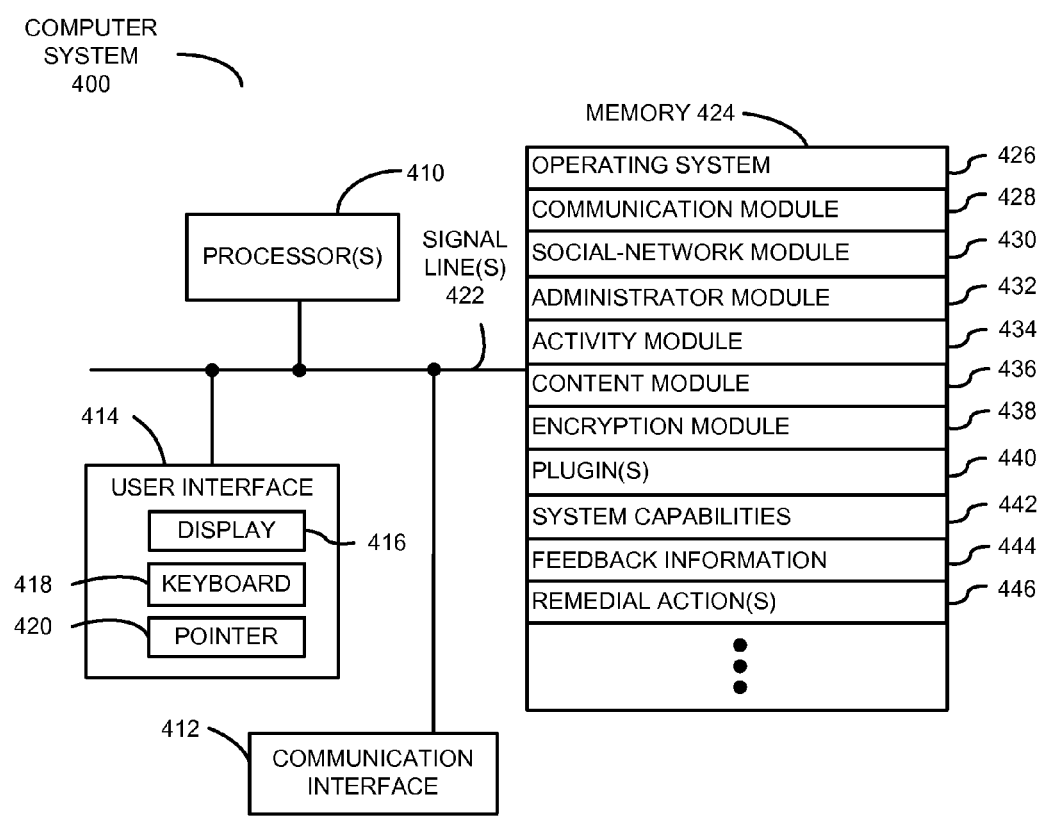
FIG. 4 is a block diagram illustrating a computer system that performs the method of FIGS. 2 and 3 in accordance with an embodiment of the present disclosure.

We now describe embodiments of a computer system for performing the system-capability-testing technique and its use. FIG. 4 presents a block diagram illustrating a computer system 400 that performs method 200 (FIGS. 2 and 3), such as system 100 in FIG. 1 or computer system 312 in FIG. 3. Computer system 400 includes one or more processing units or processors 410 (which are sometimes referred to as 'processing modules'), a communication interface 412, a user interface 414, memory 424, and one or more signal lines 422 coupling these components together. Note that the one or more processors 410 may support parallel processing and/or multi-threaded operation, the communication interface 412 may have a persistent communication connection, and the one or more signal lines 422 may constitute a communication bus. Moreover, the user interface 414 may include: a display 416 (such as a touchscreen), a keyboard 418, and/or a pointer 420 (such as a mouse).

Memory 424 in computer system 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to computer system 400.

Memory 424 may also include multiple program modules, including: social-network module 430, administrator module 432, activity module 434, content module 436, and/or encryption module 438. Note that one or more of these program modules (or sets of instructions) may constitute a computer-program mechanism, i.e., software.

During operation of computer system 400, users of a social network facilitated by social-network module 430 may set up and manage accounts using administrator module 432. Moreover, social-network module 430 may facilitate interactions among the users via communication module 428 and communication interface 412. These interactions may be tracked by activity module 434, such as viewing behavior of the users when viewing documents (and, more generally, content), provided by content module 436, in the social network that is implemented using social-network module 430.

Furthermore, system-capability testing may be performed by one or more plugins 440. For example, an application (such as social-network module 430) may provide one or more predefined system capabilities 442 to the one or more plugins 440. In response, the one or more plugins 440 may determine feedback information 444 by assessing the one or more predefined system capabilities 442. Then, based on feedback information 444, one or more remedial actions 446 may be performed, e.g., by social-network module 430 and/or operating system 426.

Because information in computer system 400 may be sensitive in nature, in some embodiments at least some of the data stored in memory 424 and/or at least some of the data communicated using communication module 428 is encrypted using encryption module 438.

Instructions in the various modules in memory 424 may be optionally implemented in a high-level procedural language, a high-level functional language, an object-oriented programming language, and/or in an assembly or machine language. Note that the programming language may be compiled or interpreted, e.g., configurable or configured, to be executed by the one or more processors.

Although computer system 400 is illustrated as having a number of discrete items, FIG. 4 is intended to be a functional description of the various features that may be present in computer system 400 rather than a structural schematic of the embodiments described herein. In practice, and as recognized by those of ordinary skill in the art, the functions of computer system 400 may be distributed over a large number of servers or computers, with various groups of the servers or computers performing particular subsets of the functions. In some embodiments, some or all of the functionality of computer system 400 is implemented in one or more application-specific integrated circuits (ASICs) and/or one or more digital signal processors (DSPs).

Computer systems (such as computer system 400), as well as electronic devices, computers and servers in system 100 (FIG. 1), may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 112 (FIG. 1) may include: the Internet, World Wide Web (WWW), an intranet, a cellular-telephone network, LAN, WAN, MAN, or a combination of networks, or other technology enabling communication between computing systems.

System 100 (FIG. 1) and/or computer system 400 may include fewer components or additional components. Moreover, two or more components may be combined into a single component, and/or a position of one or more components may be changed. In some embodiments, the functionality of system 100 (FIG. 1) and/or computer system 400 may be implemented more in hardware and less in software, or less in hardware and more in software, as is known in the art.

While a social network has been used as an illustration in the preceding embodiments, more generally the system-capability-testing technique may be used to test system capabilities in a wide variety of applications, services or systems. Moreover, the system-capability-testing technique may be used in applications where the communication or interactions among different entities (such as people, organizations, etc.) can be described by a social graph. Note that the people may be loosely affiliated with a website (such as viewers or users of the website), and thus may include people who are not formally associated (as opposed to the users of a social network who have user accounts). Thus, the connections in the social graph may be defined less stringently than by explicit acceptance of requests by individuals to associate or establish connections with each other, such as people who have previously communicated with each other (or not) using a communication protocol, or people who have previously viewed each other's home pages (or not), etc. In this way, the system-capability-testing technique may be used to expand the quality of interactions and valueadded services among relevant or potentially interested people in a more loosely defined group of people.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-system-implemented method for performing system-capability testing, the method comprising:
  receiving, from an application in an application layer at a communication plugin in a data-link layer, predefined system capabilities associated with the application;
  determining, using the communication plugin, feedback information that specifies whether the predefined system capabilities are available;
  providing the feedback information to the application from the communication plugin; and
  when the feedback information indicates that a system capability is unavailable, performing a remedial action;
  wherein:
    the communication plugin is one of multiple plugins arranged in a hierarchy; and
    system capabilities assessed by the hierarchy of plugins are interdependent, such that when a given system capability assessed by a plugin at a lower level in the hierarchy is unavailable, a second system capability assessed by a second plugin at a higher level in the hierarchy is unavailable.

2. The method of claim 1, wherein the predefined system capabilities include one of:
  an availability of communication via a network; and
  a latency of the network less than a predefined value.

3. The method of claim 1, wherein the remedial action includes one of:
  updating a version of the application;
  updating a version of the communication plugin; and
  updating a path to a location in a network.

4. The method of claim 1, wherein the application is one of multiple applications associated with a service; and
  wherein second predefined system capabilities are associated with other applications in the multiple applications.

5. The method of claim 4, wherein the method further comprises:
  receiving the second predefined system capabilities from one of the other applications at a second plugin in the application layer;
  determining, using the second plugin, second feedback information that specifies whether the second predefined system capabilities are available;
  providing the second feedback information to the one of the other applications; and
  when the second feedback information indicates that a second system capability is unavailable, performing a second remedial action.

6. The method of claim 5, wherein the second plugin includes one of: a logging plugin, a database plugin, a version plugin, and a binary-repository plugin.

7. The method of claim 1, wherein the method further comprises:
  receiving second predefined system capabilities from the application at a second plugin in the application layer;
  determining, using the second plugin, second feedback information that specifies whether the second predefined system capabilities are available;
  providing the second feedback information to the application; and
  when the second feedback information indicates that a second system capability is unavailable, performing a second remedial action.

8. The method of claim 7, wherein the second plugin includes one of: a logging plugin, a database plugin, a version plugin, and a binary-repository plugin.

9. An apparatus, comprising:
  one or more processors;
  memory; and
  a program module, wherein the program module is stored in the memory and, during operation of the apparatus, is executed by the one or more processors to perform system-capability testing, the program module including:
    instructions for receiving, from an application in an application layer at a communication plugin in a data-link layer, predefined system capabilities associated with the application;
    instructions for determining, using the communication plugin, feedback information that specifies whether the predefined system capabilities are available;
    instructions for providing the feedback information to the application; and
    instructions for performing a remedial action when the feedback information indicates that a system capability is unavailable;
  wherein:
    the communication plugin is one of multiple plugins arranged in a hierarchy; and
    system capabilities assessed by the hierarchy of plugins are interdependent, such that when a given system capability assessed by a plugin at a lower level in the hierarchy is unavailable, a second system capability assessed by a second plugin at a higher level in the hierarchy is unavailable.

10. The apparatus of claim 9, wherein the predefined system capabilities include one of:
  an availability of communication via a network; and
  a latency of the network less than a predefined value.

11. The apparatus of claim 9, wherein the remedial action includes one of:
  updating a version of the application;
  updating a version of the communication plugin; and
  updating a path to a location in a network.

12. The apparatus of claim 9, wherein the application is one of multiple applications associated with a service; and
  wherein second predefined system capabilities are associated with other applications in the multiple applications.

13. The apparatus of claim 12, wherein the program module further comprises instructions for:
receiving the second predefined system capabilities from one of the other applications at a second plugin in the application layer;
determining, using the second plugin, second feedback information that specifies whether the second predefined system capabilities are available;
providing the second feedback information to the one of the other applications; and
when the second feedback information indicates that a second system capability is unavailable, performing a second remedial action.

14. The apparatus of claim 13, wherein the second plugin includes one of: a logging plugin, a database plugin, a version plugin, and a binary-repository plugin.

15. The apparatus of claim 9, wherein the program module further comprises instructions for:
receiving second predefined system capabilities from the application at a second plugin in the application layer;
determining, using the second plugin, second feedback information that specifies whether the second predefined system capabilities are available;
providing the second feedback information to the application; and
when the second feedback information indicates that a second system capability is unavailable, performing a second remedial action.

16. The apparatus of claim 15, wherein the second plugin includes one of: a logging plugin, a database plugin, a version plugin, and a binary-repository plugin.

17. A system, comprising:
a processing module comprising a non-transitory computer-readable medium storing instructions that, when executed, cause the system to:
receive, from an application in an application layer at a communication plugin in a data-link layer, predefined system capabilities associated with the application;
determine, using the communication plugin, feedback information that specifies whether the predefined system capabilities are available;
provide the feedback information to the application; and
perform a remedial action when the feedback information indicates that a system capability is unavailable;
wherein:
the communication plugin is one of multiple plugins arranged in a hierarchy; and
system capabilities assessed by the hierarchy of plugins are interdependent, such that when a given system capability assessed by a plugin at a lower level in the hierarchy is unavailable, a second system capability assessed by a second plugin at a higher level in the hierarchy is unavailable.

18. The system of claim 17, wherein the remedial action includes one of:
updating a version of the application;
updating a version of the communication plugin; and
updating a path to a location in a network.

19. The system of claim 17, wherein the predefined system capabilities include one of:
an availability of communication via a network; and
a latency of the network less than a predefined value.

20. The system of claim 17, wherein the non-transitory computer-readable medium of the processing module further stores instructions that, when executed, cause the system to:
receive second predefined system capabilities from the application at a second plugin in the application layer;
determine, using the second plugin, second feedback information that specifies whether the second predefined system capabilities are available;
provide the second feedback information to the application; and
when the second feedback information indicates that a second system capability is unavailable, perform a second remedial action.

* * * * *